United States Patent
van Gils et al.

(10) Patent No.: US 10,143,934 B2
(45) Date of Patent: Dec. 4, 2018

(54) EVAPORATOR SYSTEM

(75) Inventors: Gerardus Adrianus Josephus van Gils, Oss (NL); Caroliene Marjan Schröder-Guijt, Nijverdal (NL); Jan Coen Akkerman, Wageningen (NL); Martijn Bastiaan Fox, Bennekorn (NL)

(73) Assignee: FRIESLAND BRANDS B.V., Amersfoort (NL)

( * ) Notice: Subject to any disclaimer, the term of this patent is extended or adjusted under 35 U.S.C. 154(b) by 721 days.

(21) Appl. No.: 14/115,895

(22) PCT Filed: May 14, 2012

(86) PCT No.: PCT/NL2012/050331
§ 371 (c)(1),
(2), (4) Date: Dec. 12, 2013

(87) PCT Pub. No.: WO2012/158027
PCT Pub. Date: Nov. 22, 2012

(65) Prior Publication Data
US 2014/0102646 A1    Apr. 17, 2014

(30) Foreign Application Priority Data
May 13, 2011  (NL) ..................... 2006776

(51) Int. Cl.
*F28D 7/16* (2006.01)
*B01D 1/28* (2006.01)
(Continued)

(52) U.S. Cl.
CPC ............. *B01D 1/06* (2013.01); *B01D 1/065* (2013.01); *B01D 1/28* (2013.01); *F28D 7/1607* (2013.01)

(58) Field of Classification Search
None
See application file for complete search history.

(56) References Cited

U.S. PATENT DOCUMENTS 1,798,354 A * 3/1931 Ris .......................... F28F 9/22
                                                    165/143
3,244,601 A    4/1966 Ernst
(Continued)

FOREIGN PATENT DOCUMENTS

EP    0 159 885 A    10/1985
EP    1 767 257 A1    3/2007
(Continued)

OTHER PUBLICATIONS

Eryener et al.: "Thermoeconomic optimization of baffle spacing for shell and tube heat exchangers". Energy Conversion and Management, Elsevier Science Publishers, Oxford, GB, vol. 47. No. 11-12. Jul. 1, 2006 (Jul. 1, 2006), pp. 1478-1489, XP027957259, ISSN: 0196-8904 [retrieved on Jul. 1, 2006] chapter 2 and chapter 3 first par.

(Continued)

Primary Examiner — Krishnan S Menon
Assistant Examiner — Bradley R Spies
(74) Attorney, Agent, or Firm — Gilberto M. Villacorta; Sunit Talapatra; Foley & Lardner LLP

(57) ABSTRACT

Evaporator system of the mechanical vapor recompression type, which has a housing (1) and evaporator tubes (2) positioned parallel to each other. A product inlet (3) in fluid communication with a distribution element (4) is connected to the evaporator tubes (2), and a secondary channel (5) is formed between the inside surface of the housing (1) and the external surfaces of the evaporator tubes (2). A vapor liquid separator (6) is positioned at a bottom side of the evaporator tubes (2) and the secondary channel (5). A compressor (7) is in fluid communication with a vapor outlet of the vapor (Continued)

liquid separator (6), and a second transport tube (8) is connected to an inlet (9) of the secondary channel (5). Each evaporator tube (2) of the plurality of evaporator tubes has an inner diameter (de) of at least 50 mm.

24 Claims, 3 Drawing Sheets

(51) Int. Cl.
    *B01D 1/26*     (2006.01)
    *B01D 1/06*     (2006.01)
    *B01D 1/22*     (2006.01)

(56) References Cited

U.S. PATENT DOCUMENTS

| | | | | |
|---|---|---|---|---|
| 3,258,060 A | * | 6/1966 | Chirico | B01D 1/26 159/13.2 |
| 3,417,804 A | * | 12/1968 | Chirico | B01D 1/065 134/31 |
| 3,846,254 A | | 11/1974 | Sephton | |
| 4,235,281 A | | 11/1980 | Fitch et al. | |
| 5,139,084 A | * | 8/1992 | Gentry | F28F 9/0132 122/510 |
| 5,156,706 A | * | 10/1992 | Sephton | B01D 1/0082 159/47.1 |
| 5,653,282 A | * | 8/1997 | Hackemesser | F22B 1/1869 165/134.1 |
| 2003/0173062 A1 | * | 9/2003 | Lomax, Jr. | B01J 8/008 165/82 |
| 2006/0231540 A1 | * | 10/2006 | Stava | B23K 9/092 219/137 PS |
| 2008/0104960 A1 | | 5/2008 | Lomax et al. | |

FOREIGN PATENT DOCUMENTS

| | | |
|---|---|---|
| GB | 967 929 A | 8/1964 |
| GB | 1 458 492 A | 12/1976 |
| WO | 2009/148822 A2 | 12/2009 |
| WO | 2010/079148 A1 | 1/2010 |

OTHER PUBLICATIONS

International Search Report, dated Jul. 2, 2012, from corresponding PCT application.
Written Opinion dated Jan. 18, 2012, from corresponding NL2006776 application.

* cited by examiner

EVAPORATOR SYSTEM

FIELD OF THE INVENTION

The present invention relates to an evaporator system of the mechanical vapor recompression type. More in particular, the present invention relates to an evaporator system comprising a housing and a plurality of evaporator tubes positioned parallel to each other, a product inlet in fluid communication with a distribution element connected to the plurality of evaporator tubes, a secondary channel being formed between the inside surface of the housing and the external surfaces of the plurality of evaporator tubes, a vapor liquid separator positioned at a bottom side of the plurality of evaporator tubes and the secondary channel, a compressor in fluid communication with a vapor outlet of the vapor liquid separator, and a second transport tube connected to the compressor and an inlet of the secondary channel.

PRIOR ART

English patent publication GB-A-1 458 492 discloses a thermo-compression type apparatus for desalting saline water. A number of evaporator tubes are provided, the nominal diameter of the tubes 40 is specified as being between 50-100 mm. Important feature of this apparatus is that it operates at a sub-atmospheric pressure (in order to lower the boiling point of the saline water).

American publication U.S. Pat. No. 3,244,601 discloses a fluted tubular distillation apparatus using corrugated tubes 42. The diameter of the tubes 42 is disclosed as being 2.5 to 6 inches.

British patent publication GB-A-967 929 discloses an evaporator system, with a structure resembling an MVR type of system. The passage on page 5, lines 71-79 discusses the graph of FIG. 8, and mentions tube diameters starting at 1 inch, and higher (1.5, 2, and 4 inch). This document indicates that it is advantageous to use higher vapor speeds in the system. This document also discloses an embodiment where multiple evaporator systems are cascaded.

International patent publication WO2010/079148 discloses a thermo-siphon evaporator for heat exchange between fluids, comprising a plurality of parallel positioned hollow tubes for forming a flow path for a first fluid.

European patent publication EP-A-1 767 257 discloses an installation for the treatment of liquid, comprising an evaporator of the Mechanical Vapor Recompression (MVR) type with a primary evaporator and a compressor means.

SUMMARY OF THE INVENTION

The present invention seeks to provide an improved evaporator system having a higher efficiency than present day evaporator systems.

According to the present invention, an evaporator system according to the preamble defined above is provided, wherein each evaporator tube of the plurality of evaporator tubes has an inner diameter of at least 50 mm. This will reduce the pressure drop in the evaporator system considerably, thus enhancing the efficiency of the evaporator system.

In a further embodiment, the second transport tube has an inner diameter of at least 900 mm, e.g. 1000 mm. This will reduce the pressure drop in another part of the evaporator system, again resulting in an increased efficiency.

The distance between two adjacent evaporator tubes is at least 1.4 times the diameter of the evaporator tube in an even further embodiment. Again this will result in less resistance and consequently a lower pressure drop in the evaporator system.

In an even further embodiment, the housing has an internal diameter which is larger than the combined diameter of the plurality of parallel positioned evaporator tubes. As a result more volume is available for the flow of steam, again resulting in a lower pressure drop in the evaporator system, and an increased efficiency.

A plurality of horizontally oriented baffles are provided in the housing in a further embodiment, each structurally supporting at least a part of the plurality of evaporator tubes. The baffles are positioned partially overlapping seen in a longitudinal direction of the housing in a further embodiment, as a result of which a meandering flow path is created. The baffles are provided with passageways in an area between the evaporator tubes and the housing in a further embodiment, reducing the pressure drop even more. In a further embodiment the baffles are provided with secondary passageways in an area between adjacent evaporator tubes, as a result of which the resistance for the steam flow may be even further reduced.

In an embodiment, the baffles are provided at a decreasing distance from each other at an increasing distance from the inlet. As a result, a more efficient steam path is created in the evaporator system.

In one specific embodiment, the housing has a height corresponding substantially to a length of the evaporator tubes, wherein the inlet part is positioned in a top part of the housing. As alternative embodiments, the housing has a height corresponding substantially to a length of the evaporator tubes, wherein the inlet part is positioned at between ⅓ and ⅔ of the height of the housing, e.g. half way the height of the housing. Circulation of steam within the housing is then improved.

In a further embodiment, the housing comprises an air release pipe in a top part and/or a bottom part of the housing. This allows to let out air entrapped in the evaporator system, thus further enhancing the efficiency in operation of the evaporator system.

The evaporator tubes are made of lean duplex steel in a further embodiment, which provides sufficient strength and rigidity for application in long tubes in an evaporator system.

In an even further embodiment, the evaporator system further comprises a feedback channel for collecting the first fluid in bottom side of the housing and re-introducing the first fluid in the distribution element. Using multi-pass techniques can increase efficiency of the evaporator system reaching high degrees of condensed product.

The present invention further relates to a combination of at least two evaporator systems according to any one of the present invention embodiments, wherein the at least two evaporator systems are connected in a series configuration.

In a further aspect, the present invention relates to a method of operating an evaporator system according to any one of the present invention embodiments, wherein the vapor speed of the vapor inside the plurality of evaporator tubes is limited to less than 25 m/s, e.g. less than 20 m/s. This has the effect that the internal drag in the system is lowered, with the result that efficiency is improved.

In a further embodiment, the vapor speed of the vapor inside the second transport tube is limited to less than 60 m/s. This also has an advantageous effect on the internal drag and losses in the system, resulting in an enhanced efficiency.

SHORT DESCRIPTION OF DRAWINGS

The present invention will be discussed in more detail below, using a number of exemplary embodiments, with reference to the attached drawings, in which FIG. 1 shows a cross sectional view of a single evaporator tube as used in the present invention embodiments;

DETAILED DESCRIPTION OF EXEMPLARY EMBODIMENTS

Evaporator systems are widely used in many applications, e.g. the drying of whey, a by-product of cheese making. Introduction of mechanical vapor recompression (MVR) types of evaporator systems has increased efficiency of the water extraction process by re-using heat efficiently using a mechanical compressor.

The evaporator systems have been improved in efficiency over the years, but still present day implementations of evaporator systems seem to function sub-optimal. It has been surprisingly found that pressure differences in the evaporator system (which is the driving force for circulation of the fluid to be treated and other fluids used in the evaporator system) are present in parts of the system where they would not be expected, or that pressure difference in certain parts are higher than expected.

Figure 1:
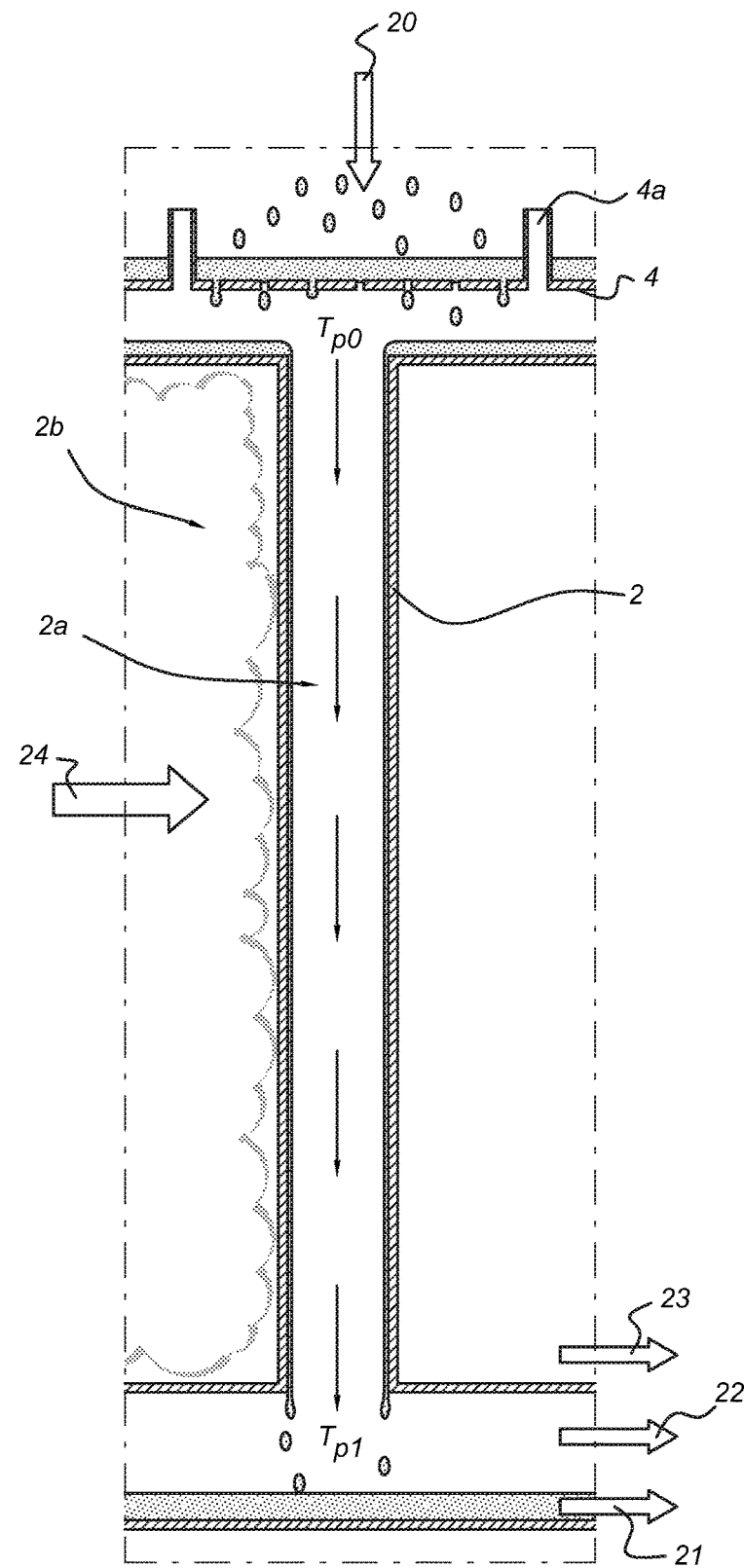

In FIG. 1, a simplified cross sectional view is shown of an evaporator tube 2 as used in an MVR type evaporator system (using a plurality of evaporator tubes 2 positioned substantially parallel to each other, see below for further constructional details). The evaporator tube 2 provides a limitation of a product/vapor side 2a inside the evaporator tube 2 and a steam side 2b outside the evaporator tube 2. The product to be subjected to the evaporation process (feed 20, e.g. a fluid product, e.g. whey or concentrated whey) is entered into the system, and is distributed over a number of evaporator tubes 2 using a distribution element 4 (in the embodiment shown additionally provided with optional vapor tubes 4a). The product flows downward in the evaporator tube 2 as a film along the inner surface of the evaporator tube 2. The evaporator tube material is heated from the outside surface by the steam input 24 on the steam side 2b. This causes parts of the fluid to evaporate, and due to the pressure difference the vapor flows downward. At the bottom of the evaporator tube 2, in the product/vapor side 2a, the processed part of the product ('concentrate' 21) can be collected (e.g. using a simple outlet structure at the bottom side), and also the evaporated components ('vapor' 22) can be extracted (and re-used in the MVR system as steam). Part of the steam in the steam side will condensate on the outer surface of the evaporator tube 2, and can also be collected at the bottom part of the steam side part 2b ('condensate' 23).

The efficiency of this evaporation process is depending on a number of factors. The vapor flows downward in the evaporator tube 2 because of the pressure difference. The higher the vapor speed, the higher the pressure difference will be ($dP \sim v^2$). The pressure difference in saturated vapor is also directly related to the temperature difference, according to well known steam tables).

In an exemplary existing MVR system, the vapor speed is >25 m/s in a bottom part of the evaporator tubes and the measured pressure difference (between top (pos. Tp0) and bottom (pos. Tp1) of evaporator tube 2, see also FIG. 2) is 15 mbar, which corresponds to a temperature difference of 1.5° C. So if $T_{p1}=60°$ C., then $T_{p0}=61.5°$ C. If the steam temperature T=65° C. the average temperature difference between the steam and the product is only 4.2° C. instead of 5° C., which results in an efficiency loss of 15%.

According to the present invention embodiments, improvements are provided in this part of the MVR type of evaporator system, but also in other parts, as will be explained with reference to the schematic view of an MVR type of evaporator system 10 shown in FIG. 2. As a result of at least some of the inventive modifications to the evaporator system of the current invention, the vapor speed is reduced to less than 25 m/s, preferable less than 20 m/s, more preferably between 15-20 m/s, preferably 10-15 m/s. This leads to less temperature differences in the vapor tubes 2 of between 0.05 and 0.2° C.

In general, the MVR type evaporator system comprises a housing 1 accommodating a plurality of evaporator tubes 2 positioned substantially parallel to each other. The product to be processed (a fluid, such as whey) is introduced through a product inlet 3 in fluid communication with a distribution element 4 connected to the plurality of evaporator tubes 2. As a result, the product to be processed is distributed over the plurality of evaporator tubes 2 using the distribution element 4, e.g. in the form of a perforated or punched plate.

A secondary channel 5 is formed between the inside surface of the housing 1 and the external surfaces of the plurality of evaporator tubes 2, allowing the use of e.g. steam to heat up the evaporator tubes 2. A vapor liquid separator 6 is positioned at a bottom side of the plurality of evaporator tubes 2 and the secondary channel 5, and a compressor 7 is in fluid communication with a vapor outlet of the vapor liquid separator 6. A second transport tube 8 is connected to the compressor 7 and an inlet 9 of the secondary channel 5.

A steam inlet 11 may be provided separately to allow an initiation of the evaporator process by allowing hot steam to be introduced into the housing 1. The steam heats up the evaporator tubes 2, and as a result, vapor is formed and flows downward in the evaporator tubes 2 (i.e. in the product/vapor side 2a as shown in FIG. 1). The vapor and concentrate originating from the inside of the evaporator tubes is collected at the bottom side of the housing 1, and separated by the vapor liquid separator 6. The vapor is then compressed using compressor 7, i.e. energy is added to the vapor. The compressed (and thus again heated vapor) is re-introduced into housing 1 using the second transport tube 8 and inlet 9 (i.e. at the steam side 2b indicated in FIG. 1).

In order to improve the efficiency of the evaporator system 1, a number of technical improvements have been implemented in parts of the system. These features can be implemented individually, in combination of some of the features, or in combination of all features.

In known evaporator systems, tubes are used for the evaporator tubes 2 having standardized dimensions, e.g. 38 mm (inner diameter). In order to reduce the pressure drop in the product/vapor side 2a (i.e. the inside of the plurality of evaporator tubes 2) of the evaporator system 1, in one embodiment of the present invention each evaporator tube 2 of the plurality of evaporator tubes has an inner diameter de (see FIG. 2) of at least 50 mm. For example the inner diameter of evaporator tube 2 is between 50-95 mm, more preferably between 55-95 mm, or between 65-95 mm, e.g. between 65-80 mm. In a further exemplary embodiment, the inner diameter of the evaporator tube 2 is between 80 and 95 mm. In order to provide sufficient contact surface for evaporation this will increase the total diameter dt of the plurality of evaporator tubes 2 (at same number of tubes 2, possibly even requiring a larger number of tubes 2). Although using larger diameter tubes 2 is associated with higher cost for the entire evaporator system 1, the gain in efficiency and resulting lower energy consumption of the evaporator system 1 will offset the increased cost rapidly during actual operation.

Exemplary embodiments with varying inner diameter de of the evaporator tubes 2 in such a evaporator system 1, based on 20.000 kg/hr water vapor at 63° C. (=148.000 m$^3$/hr) and 750 evaporator tubes 2, result in a respective vapor speed in the evaporator tubes 2 of:

| | |
|---|---|
| de = 50 mm | vapor speed = 25 m/s |
| de = 55 mm | vapor speed = 21 m/s |
| de = 65 mm | vapor speed = 15 m/s |
| de = 80 mm | vapor speed = 10 m/s |

In a further embodiment, the pressure drop in the steam side 2b of the evaporator system 1 is reduced, e.g. in one embodiment wherein the second transport tube 8 has an inner diameter ds of at least 900 mm, e.g. 1000 mm (for a vapor-flow of 20.000 kg/hr). This will reduce the vapor speed in the second transport tube 8 e.g. from 80-100 m/s to about 60 m/s. E.g. at 25000 kg/hr steam the tube 8 has a diameter of 800 mm as standard, resulting in a vapor speed of 93 m/s at 63° C. Changing the diameter of the tube 8 to 1000 mm will then result in a vapor speed of 60 m/s at 63° C. When having a lower vapor speed, e.g. 10.000 kg/hr, the inner diameter ds of the second transport tube 8 only has to be increased to 700 mm to obtain a vapor speed of about 60 m/s.

In addition or as an alternative the reduction in vapor speed can be achieved using control to lower the vapor transport or to lower the capacity, e.g. of the compressor 7.

In an even further embodiment, the heart to heart distance between two adjacent evaporator tubes 2 is at least 1.4 times the diameter de of the evaporator tube 2, e.g. at least 70 mm (note that in existing MVR designs, the heart to heart distance between pipes is about 1.2-1.3 times the tube diameter). The increased heart to heart distance of this embodiment does not have to result in a larger diameter dh of the housing 1. In the ultimate case, the total diameter dt of the plurality of tubes 2 can become equal to the housing diameter dh. In a further embodiment, the shortest distance between two adjacent evaporator tubes is between 15-40 mm. This will also decrease the resistance experienced by the steam in the steam side 2b of the evaporator system 1, as a result of which heat will be transferred to the product on the inner surface of the plurality of evaporator tubes 2 more efficiently.

In an evaporator system 10 for actual use, a large number of evaporator tubes 2 are present. In view of the cost factor, commercially available (standard) tubes 2 may be used having specific standardized dimensions, e.g. having a tube wall thickness of 1, 1.2 or 1.25 mm (depending on diameter of the evaporator tube 2).

The plurality of evaporator tubes 2 are positioned substantially in parallel to each other, e.g. using horizontally oriented structures 15, e.g. in the form of baffle plates. The combination of evaporator tubes 2 has a total diameter dt as indicated in FIG. 2. In one embodiment, the housing 1 has an internal diameter dh which is larger than the combined or total diameter dt of the plurality of parallel positioned evaporator tubes 2, e.g. at least 5% larger, even at least 10% larger or even 15% larger. This in combination with a usual spacing of the tubes 2, i.e. a heart to heart distance between tubes 2 of about 1.2-1.3 times the tube diameter de. As a result, more space is created for the steam flow in the evaporator system 1, which effectively reduces the pressure drop in the steam side 2b of the evaporator system 1 and thus increases efficiency.

In order to allow the steam to be in contact with the outside surface of the evaporator tubes 2 in an efficient manner, a plurality of horizontally oriented baffles 15 are provided in the housing 1 in a further embodiment, each structurally supporting at least a part of the plurality of evaporator tubes 2. The baffles 15 are positioned partially overlapping seen in a longitudinal direction of the housing in a further embodiment, providing a meander pattern for the steam.

Further measures can be taken to increase efficiency, e.g. by using by-pass features in the steam side 2b of the housing 1. In one embodiment, this is accomplished by having the baffles 15 provided with passageways 16 in an area between the evaporator tubes 2 and the housing 1. This additional space for the steam will result in a lower pressure loss, and hence an increased efficiency. In an even further embodiment, the baffles 15 are additionally or alternatively provided with secondary passageways in an area between adjacent evaporator tubes 2. In theory, this will result in a reduction of the temperature difference in the evaporator tube of a further 0.5° C., making the evaporator system 10 even more energy efficient.

To even further improve the efficiency of the evaporator system 1, the baffles are provided at a decreasing distance from each other at an increasing distance from the inlet 9 (i.e. in the upward direction of the evaporator system 10 above inlet 9 and in downward direction below inlet 9) in a further embodiment. E.g. starting from a mutual distance of about 1.5 m at inlet 9 of the housing closing up to about 1.0 m or even less at the top part of the housing (resp. bottom of the housing). This provides more and smaller meanders at the parts of the housing 1 further away from inlet 9, forcing the steam in more meanders and higher speed in the housing where the lowest steam flow will be. Purpose of these smaller distances is to push the entrapped air to the top resp. bottom of the evaporator and to effectively remove it from the system, e.g. using air release pipes 18 In the embodiments shown, an air release pipe 18 is provided in both the top part and bottom part of the housing 1, as an alternative embodiment, only a single air release pipe 18 may be provided.

To further enhance the effectiveness of specifically the air release pipe(s) 18, the passageways 16 are not provided for in the last baffle(s) 15 near the air release pipe(s) 18, by making sure the fluid uses the entire trajectory defined by the baffles 15.

In an even further embodiment, the housing 1 is provided with at least one section (e.g. two or three) having a respective internal diameter dh, wherein the internal diameter of the at least one section decreases with increasing distance from the inlet 9. In the section nearest to the inlet 9, the mass of the vapor flow will be highest. The further away from the inlet, the lower the mass of the vapor flow will be, allowing to work with a smaller internal diameter dh while still maintaining a very low resistance in the evaporator system 10. The change in internal diameter can be stepwise (in e.g. one or two steps), or gradual (e.g. when having only one section).

In the present invention embodiments of the evaporator system 10, evaporator tubes 2 are used of which the length depends on the actual use of the evaporator system. Depending on the operational parameters of the evaporator system 10 (vapor speed, temperature difference of vapor/product over the evaporator tube 2, the length is e.g. more than 8 m (even up to a length of 20 m).

The efficiency improvement is achieved in an embodiment wherein the housing has a height corresponding substantially to a length of the evaporator tubes 2, and wherein the inlet part 9 is positioned in a top part of the housing 1. The steam is thus introduced at one end of the housing 1, and is forced downward throughout the housing 1.

In an even further, alternative embodiment, the housing 1 has a height corresponding substantially to a length of the evaporator tubes 2, and the inlet part 9 is positioned at about ½ of the height of the housing 1 (more general positioned between ⅓ and ⅔ of the total height). E.g. when the total height of the evaporator system 1 is about 20 meter, the inlet part 9 in this embodiment is provided at about 10 meter above the bottom part of the evaporator system. This is just above the compressor 7, which is usually at about 3-4 meter above the bottom of the evaporator system 1 (for reasons of accessibility and relation to the vapor liquid separator 6). As a result, the tubing 8 from compressor 7 to the inlet part 9 is shorter, and thus more efficient. Additional effect is that the steam spreads throughout the interior of the housing 1 (i.e. steam side 2b) in a more efficient manner, as it is able to go both upward and downward in almost equal amounts.

To further enhance the flow of steam throughout the interior of housing 1, the inlet part 9 is provided with a guiding plate 9a in a further embodiment. The guiding plate 9a may be present at the connecting side of the second transport tube 8 in the inlet part 9. In a further embodiment, the inlet part 9 is provided as a vapor inlet surrounding a part of the circumference of the housing or even the entire circumference, and the guiding plate 9a may be provided as part of the inlet part 9 (e.g. in the form of a part of a cylinder).

A further possible improvement in efficiency can be obtained by a further embodiment, wherein the housing 1 comprises an air release pipe 18 in the top part of the housing 1. In the evaporator system 1, air can be trapped. As air is a bad heat conducting medium, and in addition will not condense under operating conditions of the evaporator, entrapped air will result in a loss of efficiency. By having an air release pipe 18 installed, air entrapped can be removed efficiently.

The possible air entrapped in the steam side 2b of the evaporator side 2b is heavier than the steam provided at the inlet 9. In order to ensure that entrapped air in forced upward to the air release valve 18, the speed of the steam should be sufficiently high. This can be controlled by the compressor 7, but is also dependent on the path of the steam in the housing 1, which is e.g. determined by the orientation and position of the baffle plates 15.

The features allowing to reduce the pressure drop in the product/vapor side 2a and the steam side 2b of the of the evaporator system 10 are e.g. arranged to provide a maximum pressure drop related to the capacity of the compressor 7 (in the steam side 2b of the evaporator system). E.g. the maximum pressure drop in the entire product/vapor side 2a and steam side 2b is limited to 5% of the pressure increase the compressor 7 can provide. The pressure drop in the entire product/vapor side 2a and steam side 2b is the total of the pressure drops in the evaporator tubes 2 (including inflow and outflow losses), the tubes downstream and upstream (second transport tube 8) of the compressor 7, the inlet part 9 including optional guiding plate 9a, and the lower parts of the evaporator system 10 including the vapor liquid separator 6.

The evaporator tubes 2 of the present invention embodiments are made preferably of 304 or 316L stainless steel, more preferably lean duplex steel). This type of steel allows to have a similar rigidity and constructional strength in the evaporator tubes 2 using a smaller thickness (e.g. 0.8 mm or even 0.6 mm), while still preserving good heat transfer characteristics (in general the heat transfer increases with smaller thickness). In general, four main types of duplex steels are usable, lean duplex, standard duplex, super duplex and hyper duplex. The differences between these types are the chemical analysis and their mechanical and corrosion properties. Their similarities are that they all have a ferritic solidification and that the austenite formation starts at app. 1.420° C., at app. 800° C. the austenite formation is finalized. The fact that the duplex steels have two crystal structures results in a combination of desirable properties that is beneficial to the user of the steel. The ferrite basically gives high strength and resistance to SCC (Stress Corrosion Cracking), the austenite gives ductility and general corrosion resistance. In choosing duplex in a construction it is often possible to reduce plate thickness due to the higher strength and thereby reduce weight of the construction. Lean duplex steel has a low Ni content, and combines high strength with good fatigue resistance, very good weldability (when using the right technique), good corrosion resistance and high energy absorption.

In an even further embodiment, the evaporator system 10 further comprises a feedback channel for collecting the first fluid in a bottom side of the housing 1 and re-introducing the first fluid in the distribution element 4. A fluid to be processed can then undergo multiple passes (e.g. 4 pass evaporation cycle), effectively reaching a higher degree of evaporation.

Figure 2:
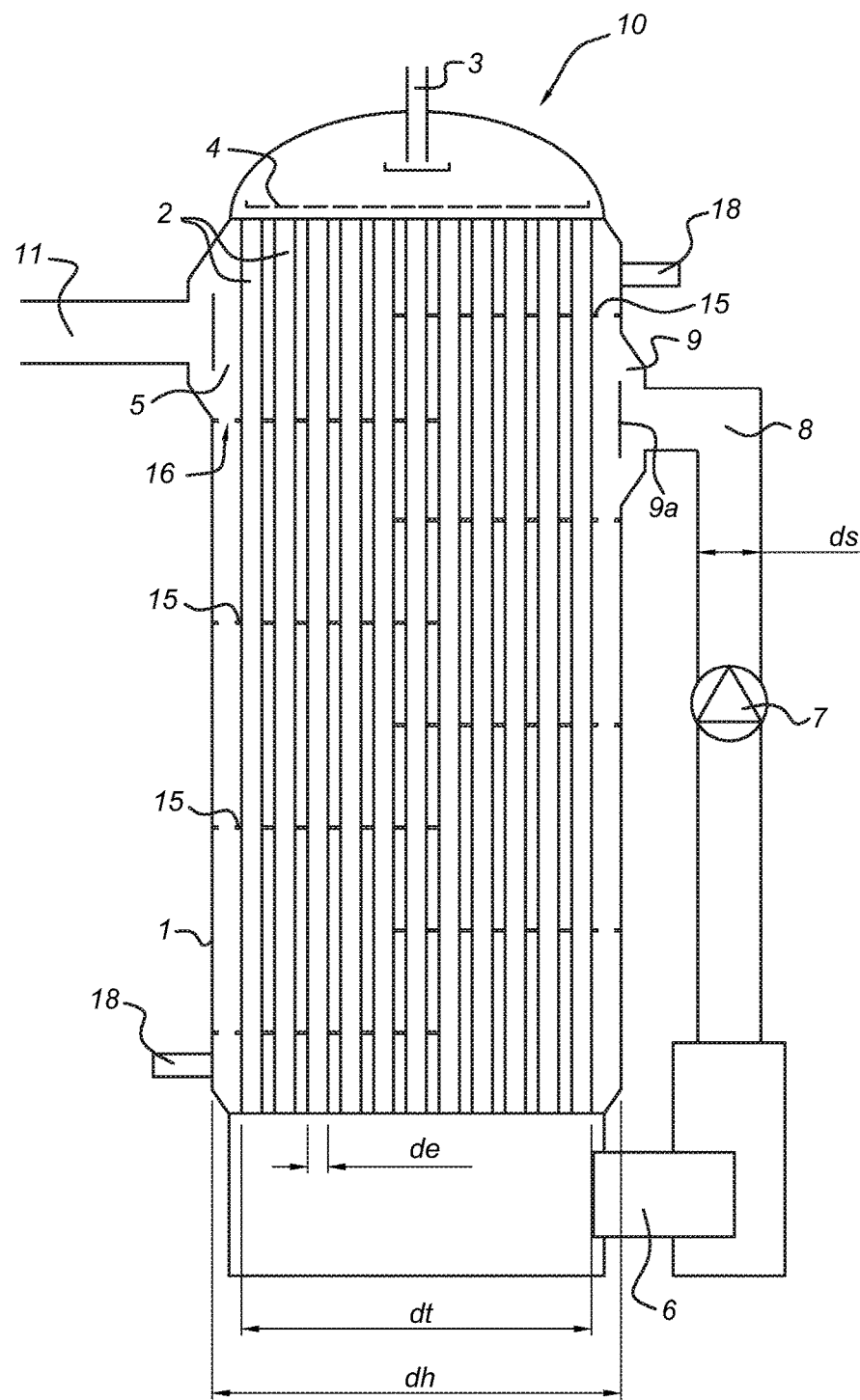
FIG. 2 shows a cross sectional view of an evaporator system wherein multiple embodiments of the present invention are implemented.
Figure 3:
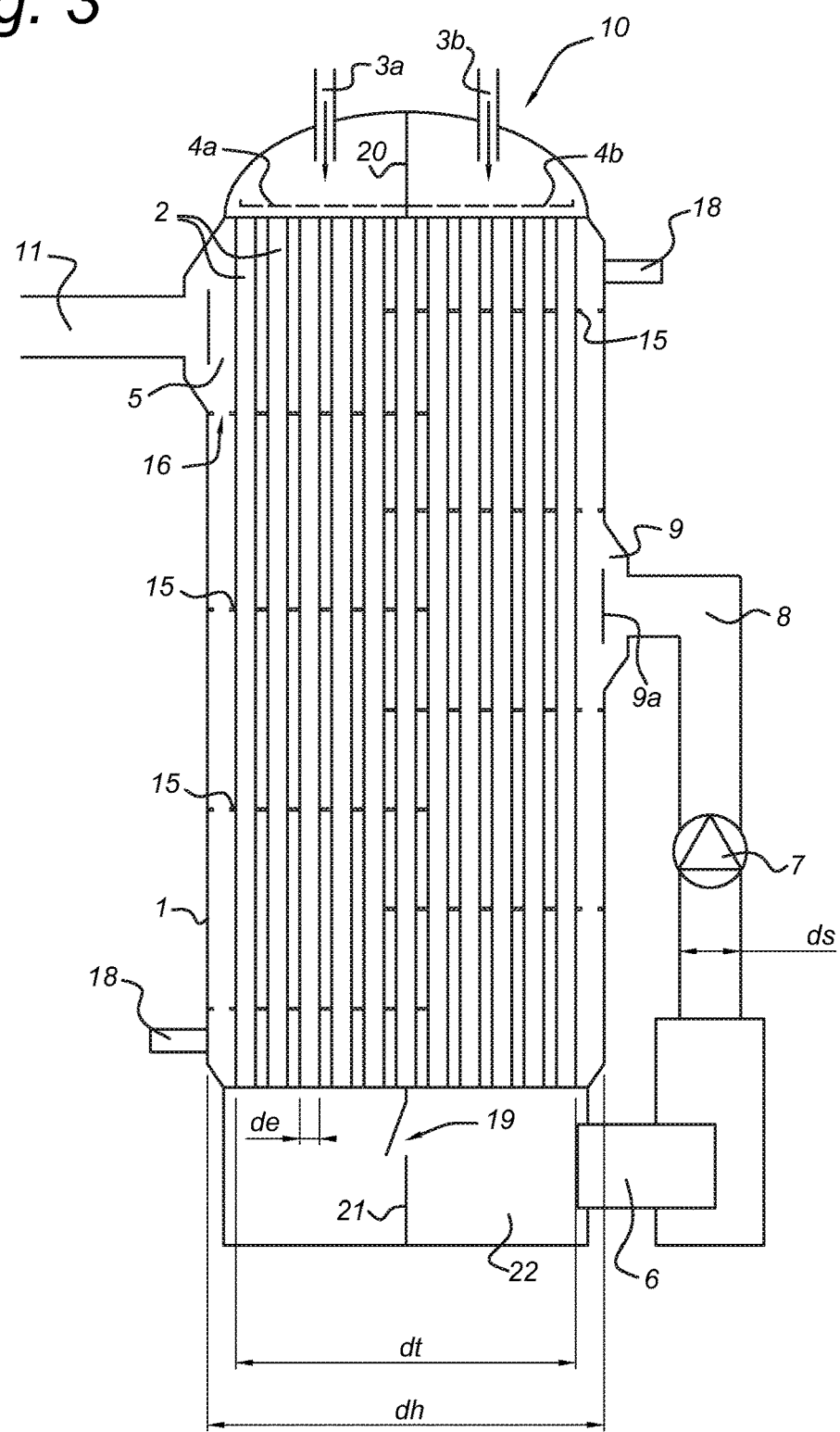
FIG. 3 shows a cross sectional view of a further embodiment of the evaporator system of the present invention.

An exemplary embodiment is shown schematically in FIG. 3, where like numerals indicate like elements of the embodiment of FIG. 2. In order to prevent forward and backward mixing of the product, the product collector elements in the bottom part 22 and the distribution element 4 in the top of the housing are adapted. Furthermore, the product inlet 3 is split in two parts 3a and 3b, wherein the untreated product is introduced in part 3a, and the once processed product in part 3b. The distribution element 4 is split in two halves 4a, 4b by a dividing wall 20 (which can run all the way through to the top of the evaporator tubes 2). In the bottom part 22 of the housing 1, a bottom dividing wall 21 is positioned (e.g. suspended from a bottom plate holding the evaporator tubes 2). The bottom dividing wall 21 is provided with an opening 19, e.g. by putting a part of the bottom dividing wall 21 askew (e.g. at between 20 and 30°, in order to obtain a good separation of the product. The opening 19 is furthermore adapted to allow to obtain a speed of the vapor of less than 60 m/s.

In a further embodiment, the entire evaporator system 10 is split in two or more parts. Specific dimensions of elements in the evaporator system can then be selected to further enhance the efficiency of the evaporator system 10. E.g. the internal diameter de of the tubes 2 can be 65 mm in a first part of the evaporator system, and 50 mm in the second (and further) part.

The present invention embodiments of the evaporator system 1 (using MVR type of recompression) can be applied as a combination of at least two evaporator systems 10 according to any one of the present invention embodiments, wherein the at least two evaporator systems 10 are connected in a series configuration. Very high evaporation rates can be achieved in such a multi stage evaporator system combination, e.g. from 6% dry solids to as high as 60% dry solids, for e.g. whey. Using all MVR type of evaporator systems 1 instead of TVR (thermal vapor recompression) types of evaporator systems or a mix of MVR and TVR evaporator systems will lower the total power consumption during operation.

The present evaporation system 10 can also be applied for processing of other products, such as milk, permeate, vegetable juices, cheese whey, delactosed cheese whey, sugar melasses, domestic or industrial waste water, spent culture broth, potato cut water (potato starch and protein recovery waste water), brewery/distillery effluents, paper industry waste water.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. A mechanical vapor recompression evaporator system, comprising:
    a housing and a plurality of evaporator tubes positioned parallel to each other, the housing including an air release pipe in a top part and/or a bottom part of the housing;
    a product inlet in fluid communication with a distribution element connected to the plurality of evaporator tubes and configured to distribute a product to be processed over the plurality of evaporator tubes;
    a secondary channel formed between an inside surface of the housing and external surfaces of the plurality of evaporator tubes;
    a vapor liquid separator positioned at a bottom side of the plurality of evaporator tubes and the secondary channel;
    a compressor in fluid communication with a vapor outlet of the vapor liquid separator; and
    a second transport tube connected to the compressor and an inlet part of the secondary channel,
    wherein a plurality of horizontally oriented baffle plates are provided in the housing, and the baffle plates are spaced at a decreasing distance from each other at an increasing distance from the inlet part of the secondary channel, and the air release pipe in the top part and/or a bottom part of the housing is near an uppermost baffle plate and/or a lowermost baffle plate of the plurality of horizontally oriented baffle plates, respectively,
    wherein the baffle plates are provided with passageways in an area between the evaporator tubes and the housing, and
    wherein the passageways are not provided in the baffle plates closest to the air release pipe.

2. The evaporator system of claim 1, wherein the second transport tube has an inner diameter ds of at least 900 mm.

3. The evaporator system of claim 1, wherein the distance between two adjacent evaporator tubes is at least 1.4 times the inner diameter de of the evaporator tube.

4. The evaporator system of claim 1, wherein the housing has an internal diameter dh which is larger than the combined diameter dt of the plurality of parallel positioned evaporator tubes.

5. The evaporator system of claim 1, wherein the plurality of horizontally oriented baffle plates are provided in the housing, each structurally supporting at least a part of the plurality of evaporator tubes.

6. The evaporator system of claim 5, wherein the baffle plates are positioned partially overlapping as seen in a longitudinal direction of the housing.

7. The evaporator system of claim 5, wherein the baffle plates are provided with secondary passageways in an area between adjacent evaporator tubes.

8. The evaporator system of claim 1,
    wherein the housing is provided with at least one section having a respective internal diameter, wherein the internal diameter dh of the at least one section decreases with increasing distance from the inlet part of the secondary channel.

9. The evaporator system of claim 1, wherein the housing has a height corresponding substantially to a length of the evaporator tubes, wherein the inlet part of the secondary channel is positioned in a top part of the housing.

10. The evaporator system of claim 1, wherein the housing has a height corresponding substantially to a length of the evaporator tubes, wherein the inlet part of the secondary channel is positioned at between ⅓ and ⅔ of the height of the housing.

11. The evaporator system of claim 1, wherein the evaporator tubes are made of lean duplex steel.

12. The evaporator system of claim 1, further comprising a feedback channel configured for collecting a first fluid in a bottom side of the housing and re-introducing the first fluid in the distribution element.

13. The evaporator system of claim 1, wherein a further evaporator system is connected in a series configuration to the evaporator system.

14. A method of operating a mechanical vapor recompression evaporator system, the evaporator system comprising:
    providing a housing and a plurality of evaporator tubes positioned parallel to each other, the housing including an air release pipe in a top part and/or a bottom part of the housing;
    providing a product inlet in fluid communication with a distribution element connected to the plurality of evaporator tubes and configured to distribute a product to be processed over the plurality of evaporator tubes;
    providing a secondary channel being formed between an inside surface of the housing and external surfaces of the plurality of evaporator tubes;
    providing a vapor liquid separator positioned at a bottom side of the plurality of evaporator tubes and the secondary channel;
    providing a compressor in fluid communication with a vapor outlet of the vapor liquid separator;
    providing a second transport tube connected to the compressor and an inlet part of the secondary channel;
    providing a plurality of horizontally oriented baffle plates in the housing, wherein the baffle plates are spaced at a decreasing distance from each other at an increasing distance from the inlet part, and the air release pipe in the top part and/or a bottom part of the housing is near an uppermost baffle plate and/or a lowermost baffle plate of the plurality of horizontally oriented baffle plates, respectively, and
    providing the baffle plates with passageways in an area between the evaporator tubes and the housing,
    wherein the passageways are not provided in the baffle plates closest to the air release pipe.

15. The method according to claim 14, wherein the vapor speed of the vapor inside the second transport tube is limited to less than 60 m/s.

16. The evaporator system of claim 1, wherein the second transport tube has an inner diameter ds of 1000 mm.

17. The method according to claim 14, wherein the vapor speed of the vapor inside the plurality of evaporator tubes is limited to less than 20 m/s.

18. The evaporator system of claim 1, wherein the mechanical vapor recompression evaporator system is arranged to limit the vapor speed of the vapor inside the plurality of evaporator tubes to less than 20 m/s.

19. The evaporator system of claim 1, wherein the inlet part is provided as a vapor inlet surrounding a part of the circumference of the housing.

20. The evaporator system of claim 1, wherein the inlet part is provided as a vapor inlet surrounding the entire circumference of the housing.

21. The evaporator system of claim 1, wherein the housing includes the air release pipe in the top part and the bottom part of the housing.

22. The evaporator system of claim 1, further comprising a bottom dividing wall in the bottom part of the housing and provided with an opening.

23. The evaporator system of claim 22, further comprising a dividing wall configured to split the distribution element into a first section and a second section.

24. The evaporator system of claim 1, wherein each evaporator tube of the plurality of evaporator tubes has an inner diameter de of at least 50 mm.

* * * * *